United States Patent
Jang et al.

(10) Patent No.: US 7,257,300 B2
(45) Date of Patent: Aug. 14, 2007

(54) METHOD FOR REDUCING HYDROGEN SENSITIVITY OF OPTICAL FIBER

(75) Inventors: Yun-Geun Jang, Gumi-si (KR); Jin-Han Kim, Gumi-si (KR); Sung-Koog Oh, Gumi-si (KR); Sung-Jin Kim, Gumi-si (KR); Jae-Ho Lee, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 10/991,317

(22) Filed: Nov. 17, 2004

(65) Prior Publication Data
US 2005/0268664 A1 Dec. 8, 2005

(30) Foreign Application Priority Data
Jun. 3, 2004 (KR) ........................ 10-2004-0040403

(51) Int. Cl.
*G02B 6/02* (2006.01)
*G02B 6/00* (2006.01)
*G03B 37/023* (2006.01)

(52) U.S. Cl. .................. 385/123; 65/385; 385/141
(58) Field of Classification Search ............... 385/123, 385/141–145; 65/385–386; 264/1.24
See application file for complete search history.

(56) References Cited

U.S. PATENT DOCUMENTS

| 6,704,485 | B1 * | 3/2004 | Campion et al. ............ 385/123 |
| 6,944,382 | B2 * | 9/2005 | Berkey et al. ............... 385/123 |
| 7,079,736 | B2 * | 7/2006 | Takahashi et al. ........... 385/123 |
| 2001/0040935 | A1 * | 11/2001 | Case .......................... 376/100 |
| 2003/0084684 | A1 * | 5/2003 | Zhang ......................... 65/391 |
| 2004/0011081 | A1 * | 1/2004 | Chang et al. ................. 65/414 |
| 2004/0136668 | A1 * | 7/2004 | Takahashi et al. ........... 385/123 |
| 2004/0139766 | A1 * | 7/2004 | Weeks et al. ................. 65/424 |

FOREIGN PATENT DOCUMENTS

| CN | 1096012 | 12/1994 |
| CN | 1340471 | 3/2002 |
| CN | 1257857 | * 5/2006 |

* cited by examiner

*Primary Examiner*—Brian Healy
*Assistant Examiner*—Charlie Peng
(74) *Attorney, Agent, or Firm*—Cha & Reiter, LLC

(57) ABSTRACT

A method for reducing the hydrogen sensitivity of an optical fiber is disclosed. The method includes a deuterium treatment step of exposing an optical fiber to a gas mixture including a deuterium, so that the optical fiber makes a contact with the deuterium, and a degassing step of degassing the optical fiber treated with the deuterium under a negative pressure condition.

6 Claims, 1 Drawing Sheet

METHOD FOR REDUCING HYDROGEN SENSITIVITY OF OPTICAL FIBER

CLAIM OF PRIORITY

This application claims priority to an application entitled "METHOD FOR REDUCING HYDROGEN SENSITIVITY OF OPTICAL FIBER," filed with the Korean Intellectual Property Office on Jun. 3, 2004 and assigned Serial No. 2004-40403, the contents of which are hereby incorporated by reference.

BACKGROUND OF THE INVENTION

1. Field of the Invention

The present invention relates to optical fibers and, more particularly, to a method of reducing the loss characteristic of an optical fiber.

2. Description of the Related Art

In general, an optical fiber includes a core and a clad surrounding the core, and the refractive index of the core is higher than the refractive index of the clad. When the optical fiber is fabricated, the optical fiber may contain an OH-radical therein due to a heat source or impurities in the raw material used to produce the optical fiber. The content of the OH-radical may increase under a high-energy radiation. It is difficult for an optical fiber to operate in the range of E-band (1360 nm~1460 nm) because of the loss characteristic of the fiber caused by the OH-radical. This phenomenon is worse if the optical fiber is exposed to a hydrogen even when the optical fiber has a little amount of the OH-radical. Such an increase in the loss of the optical fiber as a function of time due to the hydrogen is known as "hydrogen aging loss." The hydrogen aging loss may cause a serious problem when the optical fiber is being used for a long period of time.

In order to solve the above problem, a technique of replacing the OH-radical included in the optical fiber to an OD-radical has been proposed. It involves exposing the optical fiber (or an optical fiber preform) to a deuterium. Since such a replacement reaction is an irreversible reaction, the OH-radical cannot be formed in the optical fiber treated with the deuterium even if the optical fiber is exposed to hydrogen. However, the deuterium remaining in the optical fiber may exert an undesirable influence on the optical fiber when operated for a lengthy time. To address this, a degassing process must be carried out in the optical fiber after a deuterium treatment process has been performed.

U.S. Pat. No. 6,704,485, which is issued to Jean-Florent Campion, discloses a method for reducing the hydrogen sensitivity of the optical fibers at 1380 nm~1410 nm. Briefly, this method includes the steps of exposing an optical fiber to a gas mixture including a deuterium under a normal temperature (preferably, 20° C.~40° C.) and a standard pressure (or pressure higher than the standard pressure) so as to allow the optical fiber to make a contact with the deuterium, and degassing the optical fiber in a neutral atmosphere, such as a nitrogen atmosphere or an air atmosphere.

However, a deuterium treatment method and a degassing method disclosed in the above patent has the following problems.

Firstly, when a deuterium treatment time is short, the deuterium is inefficiently diffused into a core. Accordingly, in order to diffuse the deuterium into the core efficiently, the deuterium treatment process must be carried out for a long period of time (1 day to 2 weeks, preferably 3 days to 10 days).

Secondly, since 1 to 3 weeks (preferably 2 weeks) may be required for the degassing process, an excessive process time is required for the degassing process.

SUMMARY OF THE INVENTION

Accordingly, the present invention has been made to solve the above-mentioned problems occurring in the prior art and provides additional advantages, by providing a method of reducing the hydrogen sensitivity of an optical fiber by replacing the OH-radical hydrogen included in the optical fiber into a deuterium, in which the process time can be significantly reduced as compared with the process time of a conventional method.

In one embodiment, there is provided a method for reducing the hydrogen sensitivity of an optical fiber, the method comprising the steps of: exposing the optical fiber to a gas mixture including a deuterium such that the optical fiber makes a contact with the deuterium, and degassing the optical fiber treated with the deuterium under a negative pressure condition.

BRIEF DESCRIPTION OF THE DRAWINGS

The above features and advantages of the present invention will be more apparent from the following detailed description taken in conjunction with the accompanying drawing, in which.

DETAILED DESCRIPTION

Figure 1:
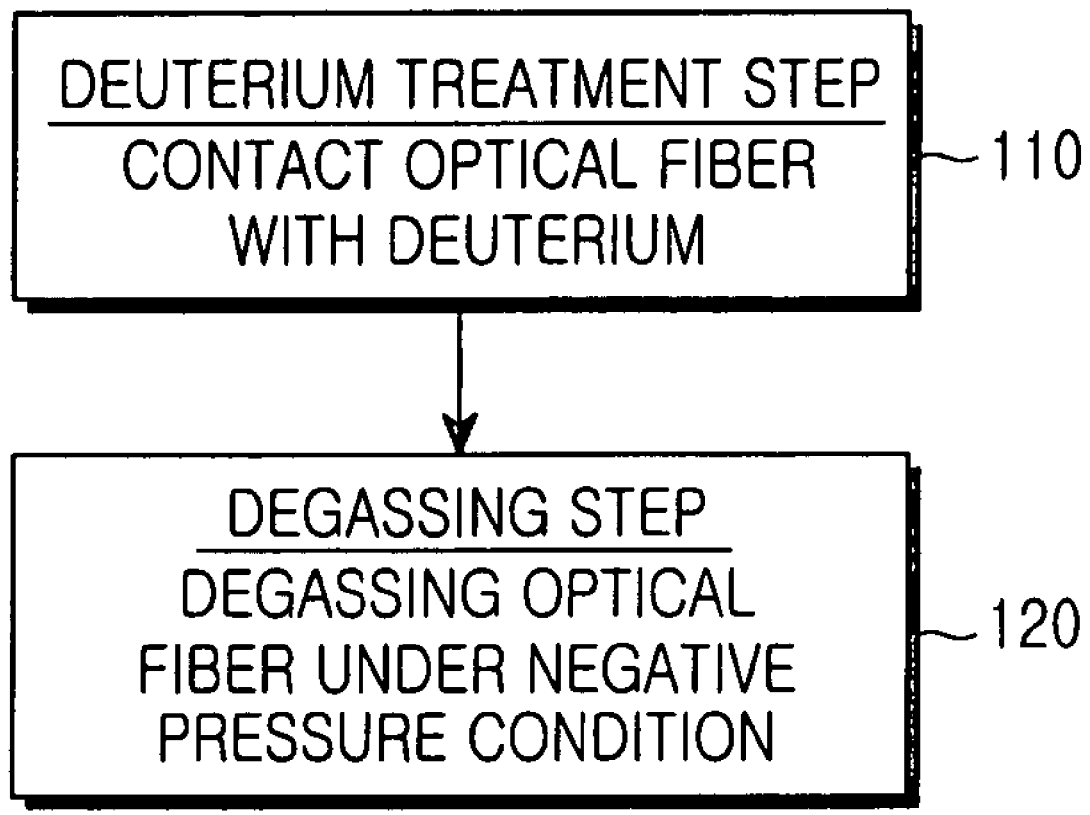
FIG. 1 is a flowchart showing a method for reducing the hydrogen sensitivity of an optical fiber according to a preferred embodiment of the present invention.

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

FIG. 1 is a flowchart showing a method for reducing the hydrogen sensitivity of an optical fiber according to an embodiment of the present invention. The method includes a deuterium treatment step 110 and a degassing step 120.

During the deuterium treatment step 110, an optical fiber is placed in a chamber, which can be closed. After the chamber is closed, a gas mixture including a deuterium is injected into the chamber. The optical fiber exposed to the gas mixture makes a contact with the deuterium so that the OH-radical hydrogen included in the optical fiber is replaced to deuterium. In addition, during such a replacement reaction, an internal temperature (that is, a reaction temperature of deuterium) of the chamber is maintained in a range of about 45° C. to 55° C.

The above reaction temperature may provide an optimum condition for diffusing deuterium, and the mobility of deuterium may be greatly improved as compared with that of the prior art. According to the prior art, a deuterium treatment process is performed under the normal temperature in order to prevent the optical fiber from being damaged. That is, if the reaction temperature of deuterium is high, a polymer may be degraded, causing damage to the optical fiber. However, the present invention provides an optimum reaction temperature that is capable of preventing the optical fiber from being damaged while optimizing the mobility of deuterium.

The gas mixture is obtained by diluting a deuterium with an inert gas, such as nitrogen. Although it is possible to use only the deuterium without using the gas mixture, since the deuterium is very expensive, it is preferable to use the gas mixture together with deuterium for a more economic result. At this time, a mixing ratio of the deuterium to the inert gas can be selected in a predetermined range. Herein, it must be considered that the deuterium treatment step may become long if the ratio of the deuterium to the inert gas is too low.

The chamber can selectively control the internal temperature and the internal pressure thereof by using a heating unit and a vacuum unit. The chamber may include a coating chamber used for a thin film-coating process.

The deuterium treatment step 110 can be performed for one to four days, preferably for two days. Since the mobility of deuterium is greatly improved by increasing the reaction temperature as compared with the conventional reaction temperature, the deuterium is rapidly diffused into a core of the optical fiber, so that the process time for the deuterium treatment step can be shortened.

After the deuterium treatment step 110 has been completed, the gas mixture contained in the chamber is exhausted to an exterior in such a manner that the chamber maintains a negative pressure state (that is, a pressure state lower than the standard pressure state). As the inside of the chamber maintains the negative pressure state, the deuterium in the optical fiber can be exhausted rapidly to the exterior as compared with the standard pressure state. That is, the optical fiber is degassed under the negative pressure state. Preferably, the inside of the chamber maintains a vacuum state, and a degassing time can be more shortened if the vacuum level in the chamber becomes high. That is, the optical fiber can be degassed under the vacuum state.

While performing the degassing step 120, the internal temperature of the chamber can be maintained with the normal temperature. In addition, the degassing step 120 can be performed for one week at maximum, or preferably for 4 to 5 days.

As described above, a method for reducing the hydrogen sensitivity of the optical fiber according to the present invention has an advantage in that the process time can be shortened as compared with a conventional process time by degassing the optical fiber treated with the deuterium under a negative pressure state.

In addition, the method for reducing the hydrogen sensitivity of the optical fiber according to the present invention has an advantage in that the process time can be shortened as compared with a conventional process time by optimizing the reaction temperature of the deuterium during the deuterium treatment step 120.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for reducing a hydrogen sensitivity of an optical fiber, the method comprising the steps of:
   i) exposing the optical fiber to a gas mixture including a deuterium to enable the optical fiber to make a contact with the deuterium; and,
   ii) degassing the optical fiber treated with the deuterium under a negative pressure condition for a period of 4 to 5 days.

2. The method as claimed in claim 1, wherein, in step i), a reaction temperature of deuterium is maintained in the range of about 45° C. to 55° C.

3. The method as claimed in claim 1, wherein step i) is performed for at least one to four days.

4. The method as claimed in claim 1, wherein step ii) is carried out under a vacuum condition.

5. The method as claimed in claim 1, wherein step i) is performed inside a chamber.

6. The method as claimed in claim 5, wherein the chamber can selectively control its internal temperature and pressure using a heating unit and a vacuum unit.

\* \* \* \* \*